United States Patent Office 3,686,078
Patented Aug. 22, 1972

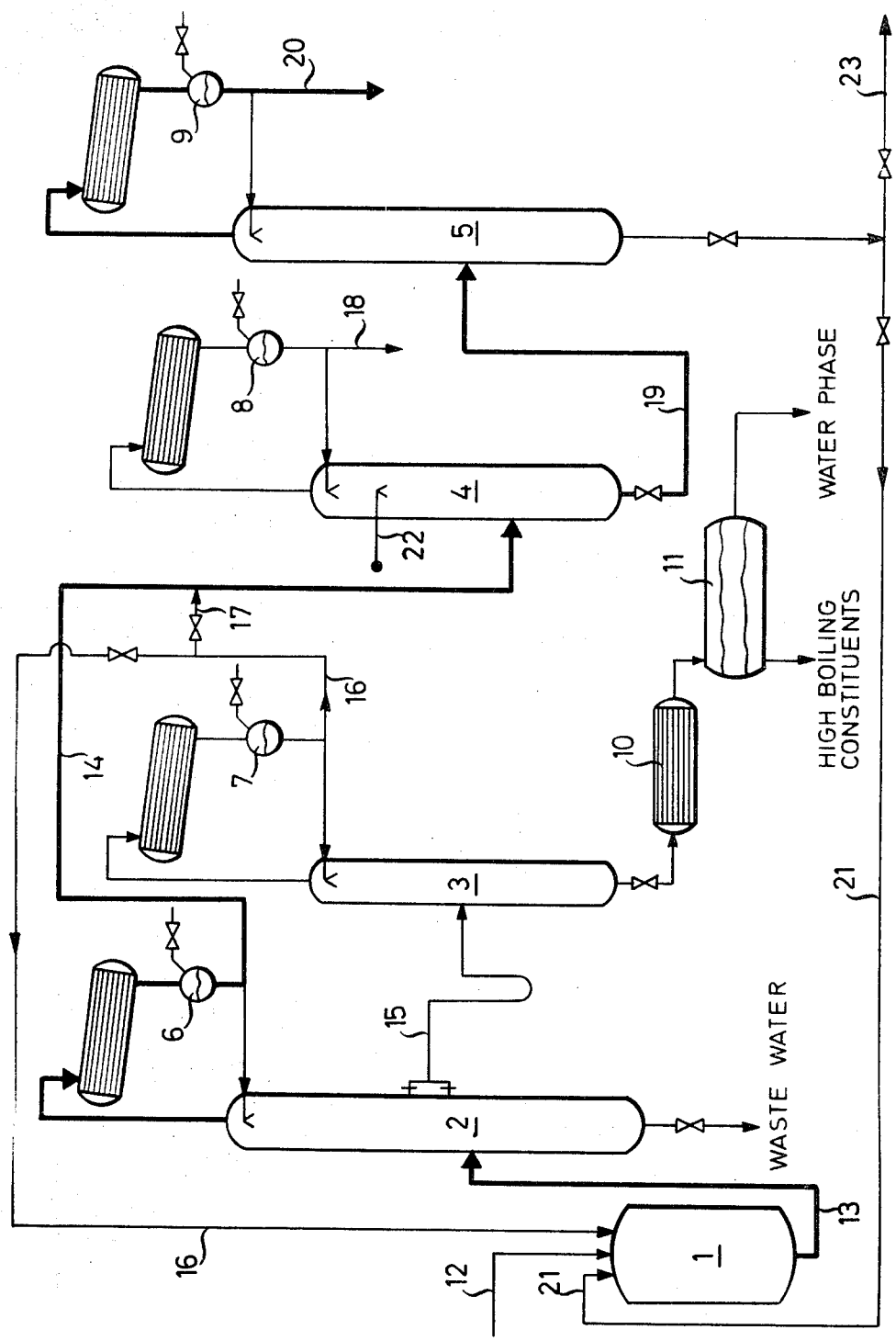

3,686,078
DISTILLATIVE PURIFICATION OF ACETONE
IN FOUR STAGES
Gerhard Hauptmann, Stierstadt, Taunus, and Erhard Weber, Kelkheim, Taunus, Germany, assignors to Farbwerke Hoechst Aktiengesellschaft vormals Meister Lucius & Bruning, Frankfurt am Main, Germany
Filed Dec. 2, 1969, Ser. No. 881,472
Claims priority, application Germany, Dec. 10, 1968,
P 18 13 673.7
Int. Cl. B01d 3/40; C07c 49/04
U.S. Cl. 203—75
7 Claims

ABSTRACT OF THE DISCLOSURE

Process for the distillative purification of crude acetone produced by oxidation of propylene in the presence of catalysts containing a noble metal and a varivalent heavy metal halide in a system of 4 distilling zones wherein aqueous acetone is distilled off in the first zone, which acetone is subjected in the second zone to an extractive distillation, pure acetone is obtained from the sump of the third zone while in the fourth zone the acetone contained in the side stream of by-products of the first zone is separated.

---

The present invention relates to a process for the distillative purification of acetone.

By direct oxidation of propylene with oxygen or oxygen containing gases in aqueous catalyst solutions containing a compound of a metal of subgroup VIII of the Periodic Table and a halide of a varivalent heavy metal acetone is obtained as main product besides a little propionaldehyde and minor proportions of chlorinated carbonyl compounds such as monochloro-acetone, dichloro-acetone and α-chloropropionaldehyde. Further by-products are obtained by oxidation of other olefins contained in technical grade propylene. Ethylene, for example, yields acetaldehyde and butylene gives methylethyl ketone.

From the said mixture pure acetone complying with standard specifications (ASTM D 329) is obtained. It must be taken into consideration that the crude acetone contains low boiling by-products such as acetaldehyde, propionaldehyde and the like, as well as high boiling products such as chlorinated carbonyl compounds and methylethyl ketone.

U.S. Pat. 3,330,741 relates to a process for continuous distillation of crude acetone produced in known manner. The crude acetone is first freed in a preliminary column from compounds the boiling point of which is below that of acetone, whereupon it is introduced into a fractionating column (main column) in the upper third of which the acetone vapors are washed with an aqueous alkaline solution. Simultaneously, the compounds having a boiling point above that of acetone which distil over in the form of an azeotropic mixture with water and further secondary products are discharged from the main column as side stream. The sump of the main column is substantially free from acetone. The fraction of high boiling constituents withdrawn from the main column as side stream generally contains a more or less important amount of acetone according to the distribution of concentration in the main column. To recover this amount of acetone the fraction must be distilled in a side column.

Belgian Pat. 696,324 relates to an improvement in the aforesaid process according to which the side column to work up the side current of by-products is replaced by an apparatus for the separation of phases. The desired separating and extracting effect is obtained by adding water. Two liquid phases are formed of which the one having the higher specific gravity and containing the major proportion of the separated by-products is eliminated while the other one which has the lower specific gravity and contains the principal proportion of the entrained acetone, is recycled into the distilling column.

According to a further variant of the aforesaid process disclosed in Belgian Pat. 703,248 the acetone vapors in the main column are washed with a suspension of alkali metal hydroxides or alkali metal carbonates in acetone instead of with an aqueous alkaline solution.

In all these processes use is made of the following distilling arrangement: preliminary column to separate the low boiling constituents, main column to obtain pure acetone and side column to work up the side current of high boiling constituents or replacement of the latter column by an apparatus for extraction and separation of phases. When working in this manner the main column has simultaneously to fulfil a plurality of functions so that it is difficult to operate. Slight variations from the optimum operation conditions have different effects as to degree and kind on the function of the column so that a permanent and very careful supervision of the column is necessary. Moreover, it turned out that low boiling constituents are newly formed in the main column, among which acrolein is particularly troublesome. Traces of this compound as impurity in the pure acetone in the order of magnitude of about 1 part per million considerably impair the stability to oxidation of the acetone, which is measured with the aid of the potassium permanganate test (according to ASTM D 1363). With an appropriate construction of the preliminary column a crude acetone from the sump thereof is free from acrolein. When this acetone is distilled in the main column the distillate contains up to about 10 p.p.m. and more of acrolein. The $KMnO_4$ test of this acetone does no longer meet the minimum conditions for a commercial product. The reason therefor is that from the α-chloropropionaldehyde, a minor proportion of which is contained in the chlorinated by-products of the process, acrolein is newly formed by separation of hydrogen chloride under the distillation conditions, the reaction being catalyzed by steel or iron surfaces.

It has, therefore, been necessary to eliminate the acrolein and other disturbing impurities by the alkaline wash which is preferably carried out in the main column. This mode of operation yields pure acetone, but it has essential disadvantages in that the process is complicated, alkali is consumed, the acetone yield is reduced by secondary reactions with the formation of resin and the operational costs are increased by the need of energy to recycle the alkaline washing agent and to work it up.

It is the object of the present invention to improve the distillation process of crude acetone obtained by direct oxidation and to avoid the drawbacks of the aforesaid processes, especially to do away with an alkaline wash for the acetone.

The present invention provides a process for distillative purification of acetone, produced by direct oxidation of propylene with oxygen or gases containing oxygen in the presence of aqueous catalyst solutions comprising a compound of a nobel metal of subgroup VIII of the Periodic Table and a halide of a varivalent heavy metal which comprises operating in a system of four distilling zones, freeing in the first distilling zone the sump quantitatively from acetone, distilling off aqueous acetone at the head and laterally withdrawing the by-products of the process having either alone or in the form of azeotropic mixtures a boiling point in the range between the boiling point of the acetone and the boiling point of water from one or several enrichment sections between the head and the sump of the said distilling zone, subjecting in a second distilling zone the distillate of the first distilling zone to an extractive distillation with water as extraction agent in order to separate as distillate the byproducts of the process the boiling point of which is below that of acetone, transporting the discharge from the sump of the second distilling zone containing water and acetone to the third distilling zone in which pure actone is obtained as distillate, and simultaneously separating in a fourth distilling zone the entrained acetone from the side streams of the first distilling zone.

According to an advantageous mode of execution of the process of the invention the portion of the distillate of the distilling zone in which the side streams of the first distilling zone are rectified which is not refluxed is admixed with the crude acetone to be purified or combined with the distillate of the first distilling zone and recycled into the second distilling zone.

A further advantageous embodiment of the invention consists in working up the side streams not in a distilling zone but in an apparatus for liquid-liquid extraction and phase separation in which the acetone entrained in the side streams of the first distilling zone is collected by adding water in a phase of lower specific gravity, which lighter phase is separately withdrawn from the phase separator and added to the crude acetone to be rectified, while the phase of higher specific gravity of the by-products is removed.

According to another advantageous mode of execution of the process of the invention the discharge from the sump of the third distilling zone still contains acetone and is added to the crude acetone to be purified. If the sump is free from acetone it is removed as waste water.

The process of the invention is preferably carried out in a distilling unit as shown in the accompanying drawing. The unit comprises four columns, a tank for the crude acetone, the respective condensers, separators and forced circulation systems. Pumps, armatures and measuring devices are not shown in the drawing.

The distillation of the crude acetone according to the process of the invention is preferably carried out at atmospheric pressure. To compensate atmospheric variations it is advantageous to operate the columns under nitrogen, for example under an excess pressure of 20 to 100 cm. of water column, whereby the influence of atmospheric moisture on the products is simultaneously excluded. It is likewise possible, however, to operate under higher pressures provided that the columns are suitable for this mode of operation.

In the process of the invention distilling columns of any construction may be used, for example, packed columns, tray columns of various types, for example sieve columns, bubble tray columns and valve tray columns, as well as combined columns.

Referring to the drawing:

The crude acetone is separated from the catalyst solution and transported into container 1 through conduit 12. From container 1 it is passed through conduit 13 into column 2 in which the acetone is subtantially distilled off together with the low boiling constituents so that the waste water discharged from the sump of column 2 is free from acetone. A short distance above the inlet of the crude acetone into column 2 one or several outlet pipes are mounted through which the high boiling constituents, i.e. a mixture of various chlorocarbonyl compounds, methylethyl ketone and further byproducts, can be removed through conduit 15. The enrichment section in the upper part of column 2 is relatively short and has a construction such that at the head of the column a mixture of acetone and water containing about 80 mole percent of acetone distils over. The distillate also contains all low boiling constituents, i.e. those formed in the reaction as well as those newly formed in the distillation in the lower part of column 2. Column 2 is connected with a reflux system 6 for the distillate. The reflux is regulated in such a manner that the temperature at the head of the column is maintained at about 60 to 70° C. (at atmospheric pressure). By this measure high boiling constituents are prevented from passing into the distillate. The portion of the distillate of column 2 which is not refluxed is fed into column 4 over conduit 14, in which column the low boiling constituents are separated from the acetone under the conditions of an extractive distillation with water as extraction agent introduced through conduit 22. The distillate of column 4 is condensed and collected in a receiver 8. Part of the condensate is recycled to the head of column 4 while the remainder of low boiling constituents is removed through conduit 18. If this product still contains noteworthy amounts of acetone, it is, of course possible to repeat the extractive distillation in a further stage not shown in the drawing under the operating conditions of column 4.

The discharge from the sump of column 4 which only contains acetone and a relatively small amount of water is passed through conduit 19 into column 5 which yields as distillate pure acetone complying with the specifications. This column has, therefore, a large enrichment section and is operated in such a manner that the water content of the distillate corresponds to the specification. The amount of reflux which is recycled from system 9, i.e. condenser and receiver, to the head of column 5 is dependent on this requirement. The pure acetone is discharged through conduit 20. The sump product of column 5 need not be distilled under severe conditions; if it still contains noteworthy amounts of acetone it is recycled into container 1 through conduit 21. With an appropriate construction of column 5 and under suitable operating conditions it is possible to obtain a sump outlet which is practically free from acetone and which is removed through conduit 23 into the drainage system.

The fraction of high boiling constituents withdrawn from column 2 through the lateral outlet pipes is fed through conduit 15 into column 3 to recover entrained acetone. The aqueous acetone distilled off partially returns over condenser and receiver 7 as reflux to the head of column 3, the remainder being either combined with the crude acetone in container 1 through conduit 16 or introduced into column 4 via conduits 16, 17 and 14.

The sump of column 3 contains the high boiling constituents and water. The outlet of the sump is cooled in condenser 10 and collected in separator 11 where the high boiling constituents separate as lower phase while the water forms the upper phase. The two phases are removed separately.

It is also possible, of course, to pass the side streams from column 2 through conduit 15 directly to condenser 10 and separator 11, optionally with addition of fresh water and to perform in this manner an extraction instead of a distillative separation of the entrained acetone. In this case, the aqueous phase of separator 11 must be combined with the crude acetone in container 1 or it must be introduced into conduit 13 to recover the acetone. This variant of the process is not shown in the drawing.

As compared with the known processes for the distillative purification of crude acetone produced by direct oxidation, the distilling system of the present invention offers the following essential advantages. The waste water is already separated in the first column of the system, whereby the volume of the distillate to be transported from column to column is considerably reduced and expenses for investment and energy are saved. Moreover, each column of the system according to the invention has to perform one essential function only, while all other operation conditions may be freely chosen. Thus, the difficult and complicated mode of operation of the main column in the known processes, which had to fulfill simultaneously 4 functions, is no longer necessary. All chlorinated by-products are separated in the distilling system according to the invention in the first column 2 and are worked up in column 3 in parallel connection with the main stream of the product to be distilled. When operating in this manner, traces of low boiling constituents, such as acrolein, are no longer formed in columns 4 or 5 so that an alkaline wash of the acetone to eliminate the said impurities can be dispensed with.

In the distillation according to the known processes the chlorinated compounds get into the main column being arranged as last column of the series. A hydrolysis of the said chlorinated compounds, depending on the operation conditions, sets free lesser or larger amounts of hydrogen chloride which forms hydrochloric acid in the presence of water. It has, therefore, been necessary to make all columns or the essential parts thereof from highly acid-resistant materials or to protect them against corrosion by special measures. This corrosion problem is simplified in the distilling system of the invention as hydrochloric acid can only be formed and cause corrosion in columns 2 and 3, whereas in columns 4 and 5 no corrosion is to be expected. It is thus possible to construct the latter columns from cheap materials. Finally, the columns used in the distilling system of the invention have lower weights than the columns of the known distillations so that the foundations and anchorages are less expensive and savings can be made with measuring and regulating equipment.

Owing to the aforesaid advantages and the more simple mode of operation the process of the invention is cheaper and can be carried out with higher security than the known processes.

The following example illustrates the invention.

EXAMPLE

Crude acetone was purified by distillation in a system as shown in the accompanying drawing. The distilling section between the product inlet and the still column 2 contained three layers of filling bodies and in the enrichment section between the product inlet and the head it was provided with 15 bubble trays. Lateral outlets for the high boiling constituents were installed at the first and third tray above the inlet. Columns 3 and 4 were packed columns and column 5 was a bubble tray column equipped with 6 bubble trays in the distilling section and 42 bubble trays in the enrichment section. Columns 2 and 3 were heated by direct steam while columns 4 and 5 were provided with evaporators. All columns had reflux systems.

260 kilograms of crude acetone originating from direct oxidation and having an acetone content of 12.1% by weight were fed per hour into column 2. When the stationary state was reached in all columns, the following acetone contents were obtained over a period of 24 hours; the percentages being by weight:

Feed column 2: 260 kg./hr. of crude acetone containing 12.1% of acetone=31.46 kg./hr. (100%)

Discharge distillate column 3: 0.725 kg./hr. containing 88.3% of acetone=0.64 kg./hr.

distillate column 4: 2.87 kg./hr. containing 5.2% of acetone=0.15 kg./hr.

distillate column 5: 30.27 kg./hr. containing 99.84% of acetone=30.22 kg./hr.

sump column 5: 9.18 kg./hr. containing 1.6% of acetone=0.15 kg./hr.

total discharge: 31.16 kg./hr. of acetone corresponding to 99% of the feed;

distillation loss: about 1%.

The pure acetone obtained (distillate of column 5) had the following properties:

density $d_4^{20}$=0.790 water content (titration with Karl-Fischer solution) 0.16% permanganate test (ASTM D 1363) >5 hours evaporation residue could not be weighed.

Hence, it follows that the pure acetone obtained met all requirements. The distillate of column 3 and the sump product of column 5 were added to the crude acetone in container 1.

What is claimed is:

1. In a process for the distillative purification of crude acetone produced by direct oxidation of propylene with oxygen or gases containing oxygen in the presence of aqueous catalyst solutions containing a compound of a noble metal of subgroup VIII of the Periodic Table and a halide of a varivalent heavy metal and wherein impurities having boiling points below that of acetone are removed by aqueous extractive distillation and water is removed from acetone by rectification, the improvement which consists esesentially of: operating in a system of four distilling zones; discharging in a first distilling zone quantitatively acetone-free waste water from the sump, distilling off at the head of said first distilling zone aqueous acetone, and discharging from several enrichment sections between the head and the sump of the said first distilling zone the by-products of the process having a boiling point in the range between the boiling point of the acetone and the boiling point of water including chlorocarbonyl compounds and methyl ethyl ketone; subjecting in a second distilling zone the distillate of the first distilling zone to said aqueous extractive distillation to separate the by-products of the process whose boiling points are below that of the acetone; passing the sump product of the second distilling zone containing water and acetone to a third distilling zone in which pure acetone is obtained as distillate; and rectifying in a fourth distilling zone the side streams of the said first distilling zone to recover the entrained acetone.

2. The process of claim 1, wherein the distillate of the said fourth distilling zone in which the side streams of said first distilling zone are rectified is combined with the crude acetone to be purified.

3. The process of claim 1, wherein the distillate of the said fourth distillation zone in which the side streams of said first distilling zone are rectified is combined with the distillate of the said first distilling zone and introduced into the said second distilling zone.

4. The process of claim 1, wherein the sump product of the said third distilling zone, which still contains acetone, is combined with the crude acetone to be purified.

5. The process of claim 1, wherein the sump product of the said third distilling zone which is free from acetone is removed as waste water.

6. The process of claim 1, which comprises operating at atmospheric pressure in all four distilling zones.

7. The process of claim 1, which comprises operating in all distilling zones under nitrogen under an excess pressure of 20 to 100 cm. of water.

References Cited

UNITED STATES PATENTS

| | | | |
|---|---|---|---|
| 2,640,017 | 5/1953 | Graff | 203—99 |
| 2,820,743 | 1/1958 | Mention et al. | 203—85 |
| 3,406,100 | 10/1968 | Karafian | 203—99 |
| 3,445,345 | 5/1969 | Katzen et al. | 203—99 |
| 2,904,592 | 9/1959 | Ellis et al. | 206—593 A |
| 2,751,337 | 6/1956 | Goddin et al. | 203—83 |
| 3,031,384 | 4/1962 | Sirois et al. | 260—593 P |
| 3,265,592 | 8/1966 | Van Der Weel | 203—97 |
| 3,330,741 | 7/1967 | Theilig et al. | 260—593 P |
| 3,365,375 | 1/1968 | Nixon | 260—593 P |
| 3,409,513 | 11/1968 | Hamlin | 260—593 P |
| 3,531,376 | 9/1970 | Minuda et al. | 260—593 P |

WILBUR L. BASCOMB, Jr., Primary Examiner

U.S. Cl. X.R.

203—17, 43, 76, 82, 83, 99; 260—597 B, 593 P